(No Model.)
T. REMUS.
BELT FASTENER.
No. 368,423. Patented Aug. 16, 1887.
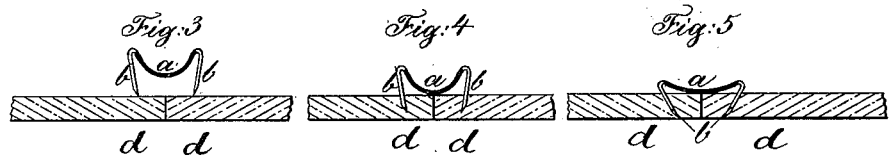
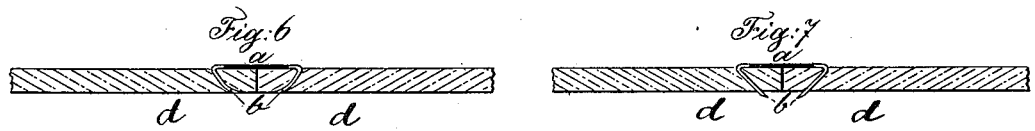
Witnesses:
W. N. Rosenbaum
Carl Karp
Inventor:
Theodor Remus
by Goepel & Raegener
Attorneys.

UNITED STATES PATENT OFFICE.

THEODOR REMUS, OF DRESDEN, SAXONY, GERMANY, ASSIGNOR OF ONE-HALF TO JEAN SCHERBEL, OF SAME PLACE.

BELT-FASTENER.

SPECIFICATION forming part of Letters Patent No. 368,423, dated August 16, 1887.

Application filed March 12, 1887. Serial No. 230,607. (No model.)

*To all whom it may concern:*

Be it known that I, THEODOR REMUS, a subject of the Emperor of Russia, residing at the city of Dresden, in the Kingdom of Saxony, Germany, have invented certain new and useful Improvements in Belt-Fasteners, of which the following is a specification.

The object of my invention is to provide a new and improved belt-fastener for uniting the ends of driving-belts.

The invention consists in a strip of sheet metal provided with teeth on its side edges, the points of which teeth are beveled and sharpened, that part of the strip between the teeth being bent concavely on the transverse line.

In the accompanying drawings, Figure 1 is a side view of my improved belt-fastener. Fig. 2 is a cross-sectional view of the same. Figs. 3, 4, 5, 6, and 7 are cross-sectional views of the belt-fastener and parts of the belt, showing the fastener in different positions.

Similar letters of reference indicate corresponding parts.

The fastener consists of a strip, $a$, of tenacious sheet metal, steel being preferred, which is provided with teeth $b$ on the side edges, which teeth are slightly inclined toward each other and have their free ends beveled inward toward each other to form cutting-edges. That part of the sheet-metal strip between the teeth $b$ is bent concavely on the transverse line, as shown in Fig. 2, the points of the teeth being some distance below the lowest point of the under or convex surface of the strip.

To unite belts by means of the fastener, the ends of the belt $d$ $d$ are abutted and the fastener is placed upon the belt ends, so that the joint between the belt ends will be directly below the center line of the fastener, as shown in Fig. 3. By means of a suitable implement a downward pressure is brought to bear upon the fastener, whereby the points of the teeth are forced into the ends of the belt until the middle of the convex or under part of the strip rests on the belt, as shown in Fig. 4. As more pressure is exerted, the concave part of the strip is flattened out, and thus the points of the teeth are brought toward each other, as shown in Fig. 5. If still more pressure is exerted, the strip is flattened out on the belts and the points of the teeth are curved slightly toward each other, as shown in Fig. 6. In case the belts are very heavy or made of webbing, the teeth $b$ are made of such length that they pass entirely through the belts, and their ends project through the opposite sides, and then their ends are bent over and clinched on the under side of the belt.

The advantages of my improved belt-fasteners are that they are very strong and durable, do not interfere with the pliability of the belt, and project very slightly from the outer surface of the belt.

Having thus described my invention, I claim as new and desire to secure by Letters Patent—

A belt-fastener consisting of a strip of sheet metal provided with teeth on the side edges, having their points beveled and sharpened, the teeth being inclined slightly toward each other, and that part of the strips between the teeth being curved transversely on a concave line, substantially as shown and described.

In testimony whereof I have signed my name to this specification in the presence of two subscribing witnesses.

THEODOR REMUS.

Witnesses:
PAUL DRUCKMÜLLER,
MAX KLIPPHAHR.